United States Patent
Naedele

(10) Patent No.: US 8,971,537 B2
(45) Date of Patent: Mar. 3, 2015

(54) ACCESS CONTROL PROTOCOL FOR EMBEDDED DEVICES

(75) Inventor: Martin Naedele, Zürich (CH)

(73) Assignee: ABB Research Ltd, Zurich (CH)

( * ) Notice: Subject to any disclaimer, the term of this patent is extended or adjusted under 35 U.S.C. 154(b) by 645 days.

(21) Appl. No.: 12/207,182

(22) Filed: Sep. 9, 2008

(65) Prior Publication Data
US 2009/0022325 A1  Jan. 22, 2009

Related U.S. Application Data

(63) Continuation of application No. PCT/CH2007/000133, filed on Mar. 10, 2007.

(30) Foreign Application Priority Data

Mar. 10, 2006 (EP) .................................. 06405110

(51) Int. Cl.
G06F 21/00 (2013.01)
H04L 29/06 (2006.01)

(52) U.S. Cl.
CPC ............ H04L 63/0442 (2013.01); H04L 63/08 (2013.01)
USPC ............................ 380/282; 713/155; 710/266

(58) Field of Classification Search
CPC ..... G06F 21/00; G06F 21/10; H04L 63/0823; H04L 63/0442; H04L 63/08
USPC .................... 380/282; 713/155, 201; 710/266
See application file for complete search history.

(56) References Cited

U.S. PATENT DOCUMENTS 5,455,953 A * 10/1995 Russell .......................... 710/266
6,148,404 A * 11/2000 Yatsukawa ....................... 726/2
(Continued)

FOREIGN PATENT DOCUMENTS

WO    WO 03/107133 A2    12/2003

OTHER PUBLICATIONS

Zrelli, S.; Shinoda, Y.; "Single sign-on framework for AAA operations within commercial mobile networks," Availability, Reliability and Security, 2006. ARES 2006. The First International Conference on, vol., No., pp. 8 pp., Apr. 20-22, 2006.*

(Continued)

*Primary Examiner* — Syed Zaidi
(74) *Attorney, Agent, or Firm* — Buchanan Ingersoll & Rooney PC

(57) ABSTRACT

The client requests from the authentication and authorization server a capability for accessing the target server. The authentication and authorization server sends client a capability ($cap_{C,S}$) comprising the public key ($pub_C$) of the client, said capability being signed with a private key ($priv_{AA}$) of the authentication and authorization server. The client sends the capability ($cap_{C,S}$) to the target server. If the capability is valid, the target server grants the client access and a data exchange session can be initiated. The disclosed protocol is scalable, as it does not require individual configuration of each target server device, allows revocation of user access within reasonable time, stores no compromisable secret data on any target server device, enables individual access permission per user, and accountability of each user.

20 Claims, 2 Drawing Sheets

(56) References Cited

U.S. PATENT DOCUMENTS

| | | | |
|---|---|---|---|
| 6,189,096 B1* | 2/2001 | Haverty | 713/155 |
| 2001/0032310 A1* | 10/2001 | Corella | 713/156 |
| 2002/0010861 A1 | 1/2002 | Matsuyama et al. | |
| 2002/0147927 A1* | 10/2002 | Tait | 713/201 |
| 2003/0149871 A1* | 8/2003 | Medvinsky | 713/155 |
| 2005/0273843 A1* | 12/2005 | Shigeeda | 726/5 |

OTHER PUBLICATIONS

Sirbu, M.A.; Chuang, J.C.-I.; "Distributed authentication in Kerberos using public key cryptography," Network and Distributed System Security, 1997. Proceedings., 1997 Symposium on, vol., No., pp. 134-141, Feb. 10-11, 1997.*

Ganesan, Ravi. "Yaksha: Augmenting Kerberos with public key cryptography." Network and Distributed System Security, 1995., Proceedings of the Symposium on. IEEE, 1995.*

Form PCT/ISA/210 (International Search Report) dated Apr. 24, 2007.

Form PCT/ISA/237 (Written Opinion of the International Searching Authority) dated Apr. 24, 2007.

Form PCT/IPEA/409 (International Preliminary Report on Patentability) dated Mar. 17, 2008.

European Search Report dated May 30, 2006.

J. Kohl et al., "The Kerberos Network Authentication Service (V5)", Network Working Group, Sep. 1993, pp. 1-112, Digital Equipment Corporation.

Clifford Neuman et al, "Kerberos: An Authentication", IEEE Communications Magazine, Sep. 1994, vol. 32, No. 9 pp. 33-38.

Marvin A. Sirbu et al., "Distributed Authentication in Kerberos Using Public Key Cryptorgaphy", Proceedings of the Internet Society Symposium on Network and Distributed System Security NDSS'97, Feb. 10-11, 1997, 18 pages.

C. Ellison, "SPKI Requirements", RFC 2692, Sep. 1999, pp. 1-14.

Carl M. Ellison et al., "Simple Public Key Certificate", Internet-Draft, Jul. 26, 1999, pp. 1-46.

John Hughes et al., "Security Assertion Markup Language (SAML) V2.0 Technical Overview", Oasis, Sep. 12, 2005, pp. 1-51.

"ITU-T Recommendation X.509/ ISO/IEC 9594-8: Information Technology—Open Systems Interconnection—The Directory: Public-Key and Attribute Certificate Frameworks", Draft ISO/IEC 9594-8, May 3, 2001, pp. 1-162.

T. Ylonen et al., "The Secure Shell (SSH) Protocol Architecture", Network Working Group, Jan. 2006, pp. 1-30.

* cited by examiner

ACCESS CONTROL PROTOCOL FOR EMBEDDED DEVICES

RELATED APPLICATIONS

This application claims priority under 35 U.S.C. §119 to EP Application 06405110.5 filed in Europe on Mar. 10, 2006, and as a continuation application under 35 U.S.C. §120 to PCT/CH2007/000133 filed as an International Application on Mar. 10, 2007 designating the U.S., the entire contents of which are hereby incorporated by reference in their entireties.

TECHNICAL FIELD

A public key-based authentication and access control system and protocol are disclosed for access control to embedded devices. For example, an access control protocol is disclosed for controlling access of a client to a plurality of target servers in a computer network system.

BACKGROUND INFORMATION

Embedded devices are today important elements of critical infrastructures like networking (routers, managed switches, firewalls), telecommunications, electric/gas/water utility automation (intelligent electronic devices, communicating e.g. standardized communication networks and systems in substation in accordance with IEC 61850), and industrial automation (PLCs, process controllers, drives robot controllers). During their operational lifetime, these embedded servers have to be accessed directly and/or remotely by human users and software processes to issue commands, to obtain measurements or status information, to diagnose failures, and to change settings and applications. As these devices are critical for their respective system, access to them should be restricted and strictly controlled. Current authentication schemes for embedded devices—mainly password based—do not provide the necessary security and scalable manageability. When discussing authentication and access control mechanisms one has to differentiate between two fundamentally different usage scenarios: the commercial scenario and the embedded device scenario:

In a commercial environment, as schematically shown in FIG. 1, which includes office work and e-commerce applications, hundreds or thousands of users and clients C access a relatively small set of services and servers S in a limited number of locations. Both the users and the servers are member of a single or very small number of authentication domains (e.g. Windows or Kerberos domains). In case of multiple authentication domains, single-sign on schemes may be used to emulate a single authentication domain to the user. User accounts can be managed efficiently because they are stored on a limited number of centralized authentication servers AA to which application servers refer the authentication decision via networks that are always available.

In contrast to the commercial environment, an embedded device environment, as schematically shown in FIG. 2, has only a comparatively small number of human users (operators, maintenance staff) and client workplaces C. These users typically belong to multiple organizations ($C_A$, $C_B$ or $C_C$), and each user, e.g. a vendor service engineer, must have the ability to access a large number of embedded devices acting as servers S. These embedded servers are distributed physically and organizationally, and thus belong to different authentication domains. In fact, in the typical embedded environment today each embedded device is its own authentication domain, which contains its own user base, because of a historical need for each device to be able to operate in full independence of other hosts and outside communication links to maximize resiliency and dependability of the system controlled by this embedded device. Such decentralized user management faces the additional challenge that the local storage and computational capabilities of embedded devices are typically much lower than those of commercial authentication and access control servers.

Due to the high demands on availability that are imposed on embedded devices, trade-off decisions on selecting authentication and access control options for embedded devices have so far deemphasized security. There is thus a strong need for a secure and efficiently manageable authentication and access control scheme for embedded devices.

A number of different authentication and access control schemes exist in the literature as well as in widely deployed IT systems.

Password-based access control and authentication directly on the embedded device is the most common mechanism today. It suffers from several major weaknesses: Access is in practice not revocable, because it is based on knowledge, and reconfiguring all affected servers would be impracticable. Also, storage limitations on the devices typically limit the number of user accounts and thus require group credentials, which prevent individual accountability. If users use the same password for multiple devices then the compromise of a single device leads to a compromise of the whole system.

The best known centralized scheme is the Kerberos authentication service which is also used for Microsoft Windows domain authentication. The Kerberos authentication service is described in detail in the two publications 'The Kerberos Network Authentication Service', J. Kohl and C. Neuman, RFC 1510, September 1993 and 'Kerberos: An Authentication Service for Computer Networks' B. Neumann and T. Ts'o, IEEE Communications Magazine, 32(9):33-38, September 1994, which are incorporated hereinto by reference. Kerberos works with capabilities called 'tickets'. After successful authentication the user obtains a 'ticket granting ticket', which can later be used to obtain an actual ticket for a target server from one or more ticket granting servers. The target server itself only checks the ticket, but not the actual user identity, for its access control decision. Kerberos uses shared secrets and symmetric cryptography to protect authenticity and confidentiality of communication between participants. Every target server has to be configured with an individual secret key which it shares with the central authentication server. This does not scale for embedded device scenarios with hundreds of devices. Kerberos itself is only concerned with authentication and access control, but not with protecting the resulting session.

Variations of Kerberos with public key cryptography have been proposed in 'Distributed Authentication in Kerberos Using Public Key Cryptography', M. Sirbu and J. Chuang, Proceedings of the Internet Society Symposium on Network and Distributed System Security NDSS'97, 1997. The public key based authentication process was separated from the access control process but not the access control process from the access to the target service. Therefore it is still necessary for each server to maintain access control lists for each user.

'SPKI Requirements', C. M. Ellison, RFC 2692, September 1999 and 'Simple Public Key Certificate', C. M. Ellison, B. Frantz, B. Lampson, R. Rivest, B. M. Thomas, and T. Ylonen, draft-ietf-spki-cert-structure-06.txt, July 1999, which are incorporated hereinto by reference describe SPKI (Simple Public Key Certificate), which is a public key based authentication and access control protocol and authentication message format. Main focus is on sophisticated rights delegation and derivation algorithms. SPKI provides no means for session protection against tampering or replay. The SPKI message format may be used within the context of the present disclosure to transport capabilities.

'Security Assertion Markup Language, V2.0 Technical Overview', J. Hughes and E. Maler, sstc-saml-techoverview-2.0-draft-08, September 2005, which is incorporated hereinto by reference, describes SAML is an XML based syntax for encoding capabilities, which may potentially be used within the context of the present disclosure to transport capabilities, but is limited due to the fact that standard SAML can only express yes/no type of access decisions, no complex permission statements. SAML also defines a number of authentication and authorization transfer protocols for single sign on and server federation, but these require online access of the server device to the authentication and access control server.

ITU. Information technology—Open Systems Interconnection—The Directory: Public-key and attribute certificate frameworks, ITU Recommendation X.509, March 2000, which is incorporated hereinto by reference, describes X509, which is a standard to encode digital certificates and additional attributes which may be used within the context of the present disclosure to transport capabilities.

'The Secure Shell Protocol Architecture', T. Ylonen and C. Lonvick, RFC 4251, January 2006, describes SSH (secure shell Protocol), which is an alternative session protection protocol with an optional public key based authentication scheme. Access control is based on ACLs stored on the server devices and for authentication the public key of each legitimate user has to be preconfigured on each server device.

SUMMARY

A public key-based authentication and access control system and protocol are disclosed which address security and manageability requirements for access control to embedded devices.

An access control protocol is disclosed for controlling access of a client to a plurality of target servers in a computer network system, the protocol comprising: storing in an authentication and authorization server information (ACLs) about the access rights of the client to the plurality of target servers, requesting, by the client, from the authentication and authorization server a capability for accessing a target server, checking, by the authentication and authorization server, based on the information stored in the data storage (ACLs), whether and what extent of access to target server is to be granted to client, and if so, sending a capability ($cap_{C,S}$) to the client, sending, by the client, the capability ($cap_{C,S}$) received from the authentication and authorization server to the target server, verifying, by the target server, the validity of the capability ($cap_{C,S}$) as well as the identity of the client and, if the capability is valid and the client is identified, allowing the client to access the target server, storing, by the client and the authentication and authorization server, in a respective data storage a private key ($priv_C$) and a public key ($pub_C$) of the client, sending, by the authentication and authorization server, a capability ($cap_{C,S}$) to client comprising the public key ($pub_C$) of the client.

In another aspect, a public key-based authentication and access control system is disclosed. Such a system employs the following protocol steps for access control to embedded devices: a client requests from an authentication and authorization server a capability for accessing a target server. the authentication and authorization server sends the client a capability ($cap_{C,S}$) comprising a public key ($pub_C$) of the client, said capability being signed with a private key ($priv_{AA}$) of the authentication and authorization server; the client sends the capability ($cap_{C,S}$) to the target server; and if the capability is valid, then the target server grants the client access to initiate a data exchange session.

DETAILED DESCRIPTION

Figure 1:
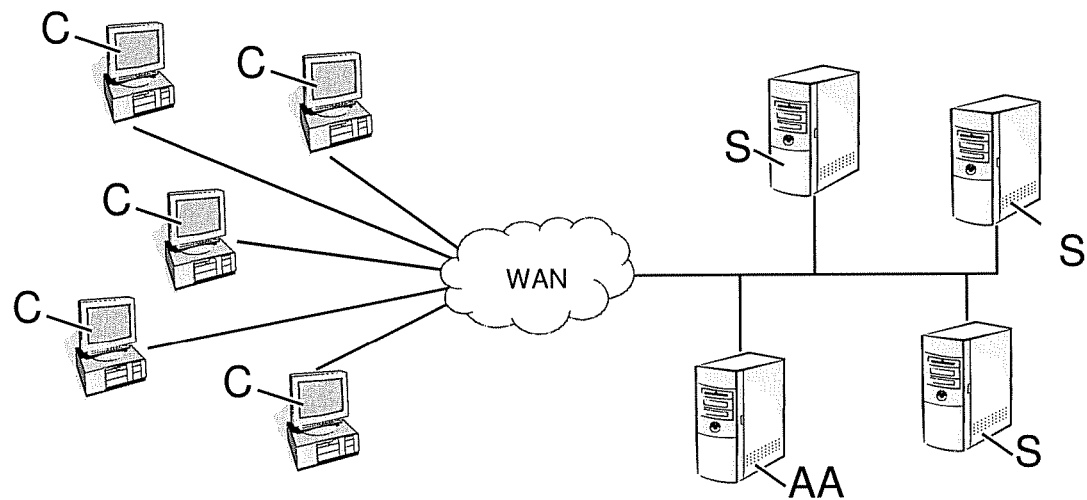
FIG. 1 shows a computer network of a commercial environment, with lots of client computers accessing a relatively small set of services and servers S in a limited number of locations.
Figure 2:
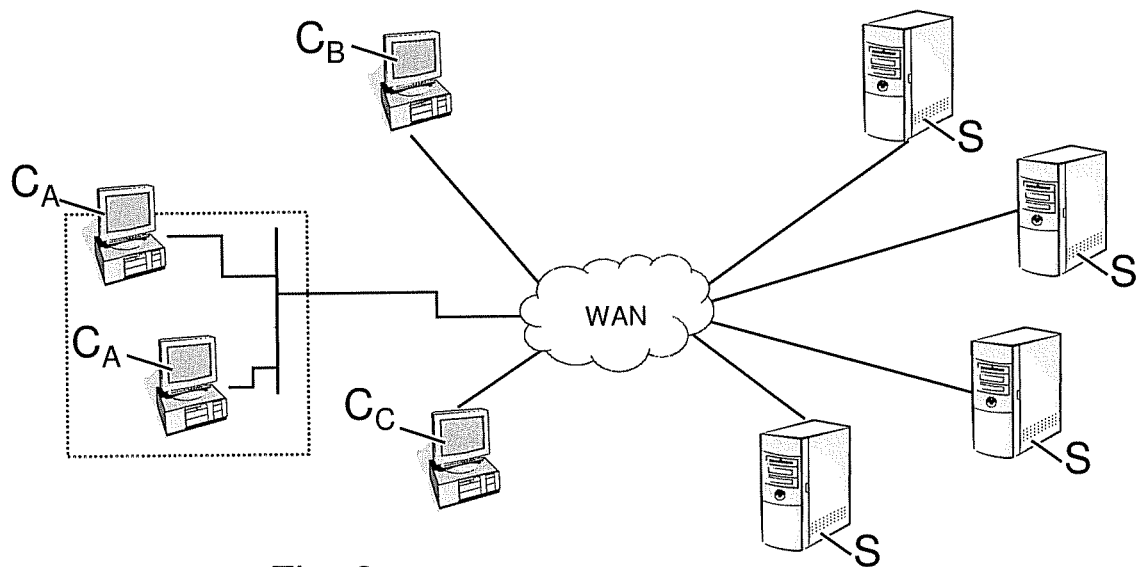
FIG. 2 shows a computer network of an embedded device environment, with a comparatively small number of client computers, typically belonging to multiple organizations accessing a large number of physically distributed, embedded devices acting as servers.

The disclosed access control protocol allows controlling the access of a client to a target server in a computer network system with many clients, many target servers and at least one authentication and authorization server. The client has its own private key stored in data storage means. The target server has a public key of the authentication and authorization server stored in data storage means. The authentication and authorization server has stored in a data storage a public key of the client as well as information about the access rights for the client to the target server.

An exemplary protocol comprises the following steps:

the client requests from the authentication and authorization server a capability for accessing the target server, the authentication and authorization server checks based on the information stored in the data storage if access to target server is to be granted to the client. If so, the authentication and authorization server sends a capability comprising the public key of the client to the client. Said capability is signed with a private key of the authentication and authorization server, the client sends the capability received from the authentication and authorization server to the target server, and the target server verifies the validity of the capability and, if the capability is valid, allows the client to access the target server.

In the exemplary computer network system each embedded target server holds a preconfigured public key of an authentication and authorization server. This key is not secret. That way, any compromise of one target server, through virtual of physical attacks, does not compromise the whole access control scheme. The servers do not have to be configured with individual keys.

The access rights of individual clients are maintained in one, or a small number of central servers under control of the access granting organization. This allows a quick roll-out of access rights changes. Role based access control may be used for scalable client rights assignment. The authentication and authorization server may be managed by the target server owner (owner of the automation system) or this may be outsourced to a trusted provider, e.g. an automation system vendor. Combined schemes with two or more serial and/or parallel authorization requests are possible. Authentication of the client towards the authentication and authorization server may be via commonly used authentication schemes like Windows/Kerberos domains, username/password, SSL, etc.

To allow clients to access the target server offline, the client obtains a capability, usually with a validity limited in time, from the central authentication and authorization server before the intended access to the target server. The capability may be encoded in computer and/or human readable format. The capability can be stored on a data storage means, e.g. on a computer readable smartcard. Additional factors, e.g. smartcard identification code (PIN), may be used to ensure access control to the capability. The capability contains the access rights which it authorizes and thus can be evaluated offline by the target server. With offline target servers there can not be a revocation scheme. The disclosed protocol mitigates this by using short expiration periods (minutes/hours) for online remote access and longer expiration periods (hours/days) if a physical visit to the target server is necessary. This scheme requires some degree of time synchronization between the central authentication and authorization server and the target server.

In order to unambiguously identify each client accessing the target server, the capability contains a client identifier.

The capability, signed by the authentication and authorization server with its own private key, contains the public key of the client. Before getting access to the target server, the client has to demonstrate that he possesses the private key. That way, the target server is able to verify the identity of the presenter of the capability. The fact that only the holder of the private key can decrypt the session key and the capability is only usable together with the client's private key, prevents client spoofing using a copy of the capability.

To prevent using a granted capability for a different server, the capability contains a server identifier. This identifier allows the server to verify that this capability has been issued for access to itself. Any request can be rejected, logged and reported if the identifier does not match.

In order to prevent replaying old messages or reusing a session key, each message from the target server to the client contains a nonce that has to be included in the next message from the client to the target server. The target server keeps track of nonces without reply. Any message with an old nonce is rejected.

In a threshold scheme or in a system with separated duties, the disclosed protocol can be extended that a client needs more than one capability to access a target server.

Established sessions can use symmetric cryptography. Either encryption (more computationally intensive) or only integrity protection are possible.

The disclosed authentication and access control scheme for embedded servers like automation systems and network devices meets an urgent need in industry because it significantly improves various security properties compared to conventional password-based schemes today in use for those systems, while at the same time improving scalability and manageability. Wide use of this scheme in an electric utility may e.g. be a key component for meeting North America Electric Reliability Council's (NERC) Critical Infrastructure Protection (CIP) requirements on roll-out time limits for access revocation (NERC CIP 004-1/B/R4.2).

In addition, capabilities with certain emergency permissions (e.g. shutdown) may be stored e.g. physically protected close to the server devices to allow execution of such emergency actions without risk of credential unavailability (forgotten password; no authorized staff available; or if the authentication and authorization server is unavailable.).

Figure 3:
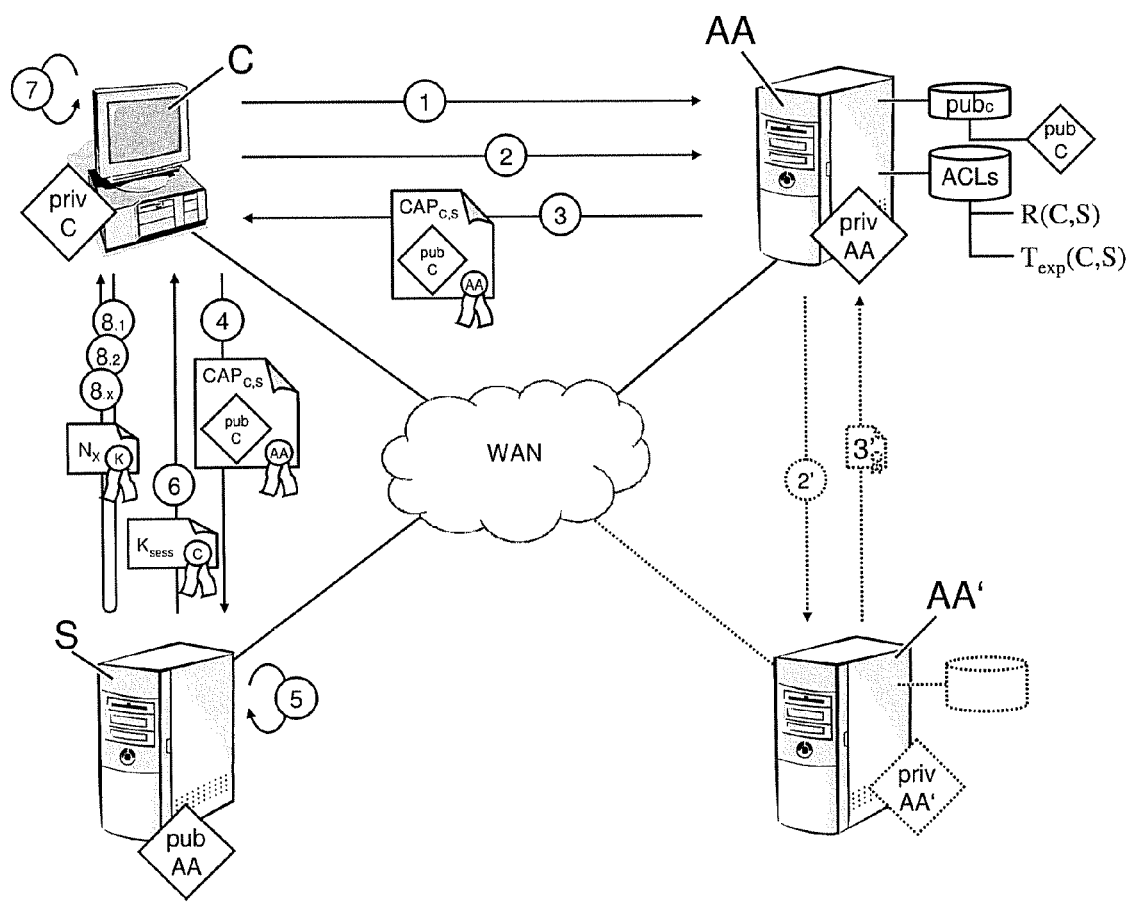
FIG. 3 shows an exemplary computer network system, an embedded device environment with an additional authentication and authorization server.

FIG. 3 schematically shows an exemplary system, comprising an embedded server S, a client C and an authentication and authorization, or short, access authority server AA. Despite only one embedded server and one client being shown, the exemplary system may comprise several embedded servers and several clients C as well as more then one access authority sever.

Each client has its own key pair $\text{pub}_C$ and $\text{priv}_C$ of which $\text{priv}_C$ is secret and only known to that client C while $\text{pub}_C$ again is a public key which is not secret.

The access authority server AA has its own key pair $\text{pub}_{AA}$ and $\text{priv}_{AA}$ of which $\text{priv}_{AA}$ is secret and only known to the access authority server AA.

The embedded servers S hold the public key $\text{pub}_{AA}$ of the access authority server AA. Being a public key, $\text{pub}_{AA}$ is not secret and is the same key for all devices, so it can be efficiently pre-installed. An unhallowed access to or control over any server S does not give an attacker information to compromise the protocol. Each server also holds some kind of identifier $\text{Id}_S$ for itself. Embedded server S and access authority server AA can share a common notion of time with a certain degree of synchronicity (technically realized e.g. via GPS). Synchronicity deviations may cause false negatives and false positives on expiration time verification.

The access authority server AA holds additional information needed to make access control decisions:

a matrix of access rights for all clients C on all target servers S. The specific rights R(C, S) in the matrix may be generic (read/write/update/delete) or application/server specific. They only need to be interpretable by the server and can thus be different for each server. This way, the same scheme can be used to manage access control for a variety of different devices.

$T_{exp}(C, S)$ is a rule set determining the expiration time of capabilities granted to a client C for access to a target server S. The actual expiration time on a capability may depend on C, S, the requested access rights, and contextual information like the intended method of accessing the server (online, or offline via direct physical/console access).

$\text{pub}_C$ for all registered clients C. This is manageable because there is only one central location where these keys need to be registered.

In the following, the individual steps of the protocol will be explained. The steps of the proposed authentication and access control protocol are indicated in FIG. 3 with numbers 1-7. Steps 1 through 3 describe to process of requesting a capability from the authentication access server, steps 4 through 7 the process of initiating a session with the target server, and step 8 the data exchange session between the client and the target server.

Step 1: Client C successfully authenticates to access authority server AA. It is assumed that there is a mechanism in place that allows the client C to authenticate to the access authority server AA and communicate with the access authority server AA in a sufficiently secure way. For this purpose, the scalability issue mentioned above is not a concern, because the client C is authenticating itself to a single, central server. Common approaches like Windows domain authentication or Kerberos can be used for this purpose.

Step 2: Client C requests from the access authority server AA a capability, a transportable representation of permissions, with access rights R' and expiration time $T'_{exp}$ for the target server identified by Ids. Note that $\text{Id}_C$ may be an explicit part of the request message or may be obtained by the access authority server AA from contextual information out of the authenticated session between the C and the access authority server AA.

$$C \rightarrow AA: \{Id_S, R', Id_C, T'_{exp}\}$$

Step 3: The access authority server AA checks, based on the information stored in its databases, whether and to what extent under the given circumstances, such as the requested rights and the intended access method (online, offline), access to the target server S can be granted to the client C. The access authority server AA issues then an appropriate capability which is then sent to the client C. The capability is signed with the private key of the access authority server AA. Note that in practice only the hash will be signed. The unique identifier $Id_C$ of client C is included to enable the target server to log the actual client, even though the target server S does not itself authenticate the client C, in order to allow retrospective identification of the client user if necessary. The public key $pub_C$ of the client C is included for use in later message exchanges between the client C and the target server S so that the target server S can be sure only the client C (defined by ownership of $priv_C$) will be able to decrypt messages encrypted with $pub_C$. The unique identifier of the addressed server $Id_S$ allows the server to verify that the capability is issued for itself, not any other server. R"={R1,R2,R3, . . . } indicate the set of granted access rights formulated in any access rights language acceptable for/understandable by the specific target server S. R' is calculated as the intersection of the requested rights R' and the rights available to the client according to the authorization database R(C, S). $T''_{exp}$ specifies the expiration time of this capability. $T''_{exp}$ is a function of the requested expiration time $T'_{exp}$ and the expiration time calculation rule set $T_{exp}(C, S)$.

AA→C:$Cap_{C,S}$={$Id_C$,$pub_C$,$Id_S$,R",$T''_{exp}$}$priv_{AA}$

As mentioned above, the authentication of the client C to the access authority server AA and vice versa as well as the protection (confidentiality, integrity) of these messages are assumed to be available and thus outside the scope of this protocol.

Optionally, an additional capability request may be directed to another access authority server AA' (steps 2', 3'), e.g. to verify that the access authority server AA still has permission to issue capabilities for the target server S. This may e.g. be used in a scenario where a service provider runs its own access authority server AA for its employees, but the access authority server AA' of the server owner has to acknowledge that the service provider is still in good standing and entitled to authorize its employees. Alternatively, access authority servers AA and AA' could be parallel alternatives to increase availability.

Step 4: The Client C sends the capability $cap_{C,S}$ received from the access authority server AA to target server S. This may be done over a network or offline via direct console or front panel access.

C→S:$cap_{C,S}$

Step 5: The target server S verifies capability $cap_{C,S}$ by checking
the signature of the access authority server AA on the capability $cap_{C,S}$ using the public key of the access authority server AA S:{$cap_{C,S}$}$pub_{AA}$=?{$Id_C$,$pub_C$,$Id_S$,R",$T''_{exp}$} whether the capability $cap_{C,S}$ is indeed addressed to S
whether the capability has not yet expired S:t<$T''_{exp}$ The order of the verification steps as listed is not binding.

Step 6: Once the capability has proven to be valid, the target server S generates a random symmetric session key $K_{sess}$. The target server S encrypts the session key $K_{sess}$ and a nonce N with the public key of the client obtained from the capability signed by the access authority server AA. The nonce, a parameter that varies with time, may be a long counter or timestamp and must not necessarily be random. In practice, a symmetric key K' may typically be used for encrypting K, N and only this key K' will be encrypted using $pub_C$.

S→C:{$K_{sess}$,$N_1$}$pub_C$

Step 7: The client C decrypts the session key using its own private key $priv_C$.

C:{$K_{sess}$,$N_1$}={{$K_{sess}$,$N_1$}$pub_C$}$priv_C$

Step 8: To start the actual data exchange within the session, the client C sends data/commands to the target server S. The shared symmetric session key may be used for encryption or integrity protection using e.g. a MAC/keyed hash. Via the nonce N, the target server S can verify that the message received from the client is an expected, not injected or replayed, message.

C→S:{$N_1$,data}$K_{sess}$(encrypted)

or

C→S:{{$N_1$,data},MAC($N_1$,data,$K_{sess}$)}(integrity protected)

The target server S verifies that capability is still valid and has not yet expired and that the nonce is correct (as expected).

S:t<$T''_{exp}$; nonce=$N_1$

The target server S verifies that the request/command sent by the client is authorized by the presented capability. If the request/command is authorized, the target server executes the request/command and returns data to the client. Again, shared symmetric session key may be used for encryption or integrity protection.

Step 8 may be repeated for further client messages within the same session (steps 8.1, 8.2, . . . , 8.x). For that purpose the target server S issues another nonce $N_2$, . . . , $N_X$, which is sent to the client together with the returned data of the previous client message. The new nonce is to be used by the client for a further message to the target server in the same session. The new nonce may, of course, be omitted if no further client message is expected.

C→S:{$N_2$,data}$K_{sess}$ or

C→S:{{$N_2$,data},MAC($N_2$,data,$K_{sess}$)}

One capability can be used to establish more than just the one session between the client and the target server. In order to establish additional sessions with the target server steps 4-8 may be repeated within the capability validity period. For each session, a separate session key is negotiated. Once the capability validity has expired, a new capability will have to be requested from the access authority server.

The following section contains a number of design considerations for the disclosed protocol:

Configuration scalability: By configuring the same public key of the access authority server AA in each target server, no server specific key management is necessary. Multiple access authority server keys could be installed in each server to allow parallel use of multiple access authorities (increased availability) or for partitioning the access rights to certain access authorities. This may be used e.g. in a scenario where a diagnosis service provider is allowed to run its own access authority to access the servers of a customer, but this access authority is limited on the server side to read permissions only.

Protection against protocol compromise via server compromise: The servers store no secrets, which could be used to compromise the protocol. Note that this implies that there is, like with conventional password-based authentication and access control, no authentication of the server to the client. This is a trade-off between security and manageability. In consequence, an attacker could spoof a server towards a client. However, this attack would only allow denial of service and the injection of wrong data into the client, while it can not be used to inject malicious data or commands into the server.

Quick roll-out of authorization changes: Client access rights to target servers (the access matrix) are maintained in one (or a small number of) central servers under control of the access granting organization. Role based access control may be used on this central server for scalable client rights assignment. Thus, any change can be rolled out by means of a single change action and will be effective after at most the longest expiration time for a capability issued before the roll-out.

Trade-off between manageability and required trust: The access authority server may be managed by the organization owning the target server servers or its operation may be outsourced to a trusted service provider, e.g. an automation system vendor. Combined schemes with two chained (AND) or parallel (OR) authorization requests are possible.

Offline use: In some situations a physical presence at the embedded server is necessary for maintenance actions and no network connectivity to any outside service is available. For this scenario, the service technician acquires a capability with a suitable expiration period from the access authorization server before traveling to the embedded server location. The capability contains the access rights which it authorizes and thus can be evaluated offline by the target server.

Limit of validity of a capability: Knowledge-based authentication and access control rights (passwords) can not be revoked without reconfiguring all serves. Other existing revocation schemes do not work with offline servers. The proposed protocol addresses this issue by using single purpose capabilities with short expiration periods (minutes/hours), for online remote access, and days, if a physical visit to the target server is necessary. Note that expiration-based revocation requires some degree of time synchronization between the access authorization server and the embedded servers.

Audibility: Each client accessing the target server shall be unambiguously individually identified. For this purpose the capability contains a client identifier $Id_C$, which may be logged by the accessed embedded server.

Prevention of client spoofing via copied capabilities: The capability signed by the access authority server contains the public key of the client. The client has to demonstrate that it has access to the corresponding private key $priv_C$ in order to successfully participate in the protocol (decrypt the session key).

Ensuring that a capability can only be used for the intended server: The target server identifier $Id_S$ in the capability allows the target server to verify that this capability has been issued for access to itself. Note that this requires some kind of unique identifier for each target server, such as a device name or communication address, that can not be changed without be subject to access control. Of course, this opens the scheme to a potential privilege escalation attempt, if the permissions needed for changing the target server identity do not constitute the highest level of access rights for the target server.

Computational efficiency: The established session uses symmetric cryptography. Either encryption (more computationally intensive) or integrity protection only are possible.

Replay prevention: Each message from the target server to the client contains a nonce that has to be included in the next message from the client to the target server. The target server keeps track of nonces without reply. Any message with an unexpected (e.g. old) nonce is rejected. Note that a lost message (loss of synchronization) may break communication. A window scheme may be used to partially mitigate this problem with a small increase of the risk of replay attacks.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF USED ABBREVIATIONS AND REFERENCE SYMBOLS

AA authentication and authorization server
ACLs Access Control List-database
C Client
S Target Server
$Id_C$ unique identifier of client C
$Id_S$ unique identifier of the addressed server
$priv_{AA}$ private key of the authentication and authorization server
$pub_{AA}$ public key of the authentication and authorization server
$priv_C$ private key of the client C
$pub_C$ Public key of the client C
$R_{(C,S)}$ access rights
Texp expiration time of a capability
$Cap_{C,S}$ capability, a transportable representation of permission for the client C to access target server S
$K_{sess}$ Key for session
N nonce, a variable parameter

What is claimed is:
1. An access control protocol product for controlling access of a client to a plurality of target servers in a computer network system, the access control protocol product including a non-transitory computer readable medium having an access control protocol stored thereon, the access control protocol product causing clients and target servers in the computer network to execute the access control protocol comprising:
   storing, in an authentication and authorization server, information (ACLs) about the access rights of the client to the plurality of target servers, and a public key ($pub_C$) of the client;
   requesting, by the client, from the authentication and authorization server a capability for accessing a target, wherein the capability ($cap_{C,S}$) includes a public key ($pub_C$) of the client;
   checking, by the authentication and authorization server, based on the information stored in the data storage (ACLs), whether a client has access rights to the target server and an extent of access rights to the target server to be granted to client, and sending a capability ($cap_{C,S}$) to the client based on the check;
   sending, by the client, the capability ($cap_{C,S}$) received from the authentication and authorization server to the target server;
   verifying, by the target server, the validity of the capability ($cap_{C,S}$), the identity of the client by verifying that the client has access to a private key ($priv_c$) which corresponds to the public key ($pub_c$) comprised in the capa- bility ($cap_{C,S}$) and, if the capability is valid and the client is identified, allowing the client to access the target server.

2. The access control protocol product of claim 1, wherein a unique identifier ($Id_C$) of the client is included in the capability ($cap_{C,S}$) to enable the target server to log the actual client even though the target server does not itself authenticate the client.

3. The access control protocol product of claim 1, wherein the target server has stored in a data storage a public key ($pub_{A,A}$) of the authentication and authorization server, comprising:
   signing said capability with a private key ($priv_{A,A}$) of the authentication and authorization server; and
   verifying, by the target server, the validity of the capability ($cap_{C,S}$) by checking the signature of the access authority server on the capability ($cap_{C,S}$), using the public key ($pub_{A,A}$) of the access authority server.

4. The access control protocol product of claim 1, wherein a unique identifier ($Id_S$) of the target Server is included in the capability ($cap_{C,S}$), and the target server verifies the validity of the capability ($cap_{C,S}$) by checking the unique identifier ($Id_S$).

5. The access control protocol product of claim 1, wherein the information stored in the data storage (ACLs) of the authentication and authorization server comprises rules about expiration times of capabilities, an expiration time ($T_{exp}$) is included in the capability ($cap_{C,S}$) and the target server verifies the validity of the capability ($cap_{C,S}$) by comparing an actual time to the expiration time ($T_{exp}$).

6. The access control protocol product of claim 1, wherein the computer network system comprises at least one additional target Server, and wherein, in a single request to the authentication and authorization server, the client requests a capability for accessing multiple target servers.

7. The access control protocol product of claim 1, wherein the computer network system comprises at least one additional authentication and authorization server, wherein the target server has stored additionally in the data storage a public key ($pub_{A,A}$) of the at least one additional authentication and authorization server and wherein the capability ($cap_{C,S}$) is signed by more than one authentication and authorization servers.

8. The access control protocol product of claim 1, comprising:
   allowing, by the target server, the client to access the target server by generating a random session key ($K_{sess}$), encrypting said session key with the public key ($pub_C$) of the client and sending said encrypted session key to the client.

9. The access control protocol product of claim 1, wherein the target server generates a nonce, which is sent along with the session key to the client, said nonce being used by the target server to verify that a later message is not an unexpected, injected or replayed message.

10. The access control protocol product of claim 1, wherein the target server grants the client access only upon presenting multiple capabilities, each of the capabilities authorizing the requested access.

11. The access control protocol product of claim 2, wherein the target server has stored in a data storage a public key ($pub_{A,A}$) of the authentication and authorization server, comprising:
   signing said capability with a private key ($priv_{A,A}$) of the authentication and authorization server; and
   verifying, by the target server, the validity of the capability ($cap_{C,S}$) by checking the signature of the access authority server on the capability ($cap_{C,S}$), using the public key ($pub_{A,A}$) of the access authority server.

12. The access control protocol product of claim 3, wherein a unique identifier ($Id_S$) of the target Server is included in the capability ($cap_{C,S}$), and the target server verifies the validity of the capability ($cap_{C,S}$) by checking the unique identifier ($Id_S$).

13. The access control protocol product of claim 4, wherein the information stored in the data storage (ACLs) of the authentication and authorization server comprises rules about expiration times of capabilities, an expiration time ($T_{exp}$) is included in the capability ($cap_{C,S}$) and the target server verifies the validity of the capability ($cap_{C,S}$) by comparing an actual time to the expiration time ($T_{exp}$).

14. The access control protocol product of claim 5, wherein the computer network system comprises at least one additional target Server, and wherein, in a single request to the authentication and authorization server, the client requests a capability for accessing multiple target servers.

15. The access control protocol product of claim 6, wherein the computer network system comprises at least one additional authentication and authorization server, wherein the target server has stored additionally in the data storage a public key ($pub_{A,A}$) of the at least one additional authentication and authorization server and wherein the capability ($cap_{C,S}$) is signed by more than one authentication and authorization servers.

16. The access control protocol product of claim 7, comprising:
   allowing, by the target server, the client to access the target server by generating a random session key ($K_{sess}$), encrypting said session key with the public key ($pub_C$) of the client and sending said encrypted session key to the client.

17. The access control protocol product of claim 8, wherein the target server generates a nonce, which is sent along with the session key to the client, said nonce being used by the target server to verify that a later message is not an unexpected, injected or replayed message.

18. The access control protocol product of claim 9, wherein the target server grants the client access only upon presenting multiple capabilities, each of the capabilities authorizing the requested access.

19. A public key-based authentication and access control system, the system employing the following protocol steps for access control to embedded devices:
   a client requests from an authentication and authorization server a capability for accessing a target server;
   the authentication and authorization server sends to the client, via a network, a capability ($cap_{C,S}$) comprising a public key ($pub_C$) of the client, said capability being signed with a private key ($priv_{A,A}$) of the authentication and authorization server;
   the client sends the capability ($cap_{C,S}$) to the target server;
   the target server verifies the validity of the capability ($cap_{C,S}$), verifies the identity of the client by verifying that the client has access to a private key ($priv_c$) which corresponds to the public key ($pub_c$) comprised in the capability ($cap_{C,S}$); and
   if the capability is valid, then the target server grants the client access to initiate a data exchange session.

20. The public key-based authentication and access control system of claim 19, wherein the protocol is scalable, allows revocation of user access, and enables individual access permission.

* * * * *